Aug. 30, 1932.                H. H. TALBOYS                1,874,831
                            EXCAVATING MACHINE
                            Filed Feb. 12, 1930           4 Sheets-Sheet 4
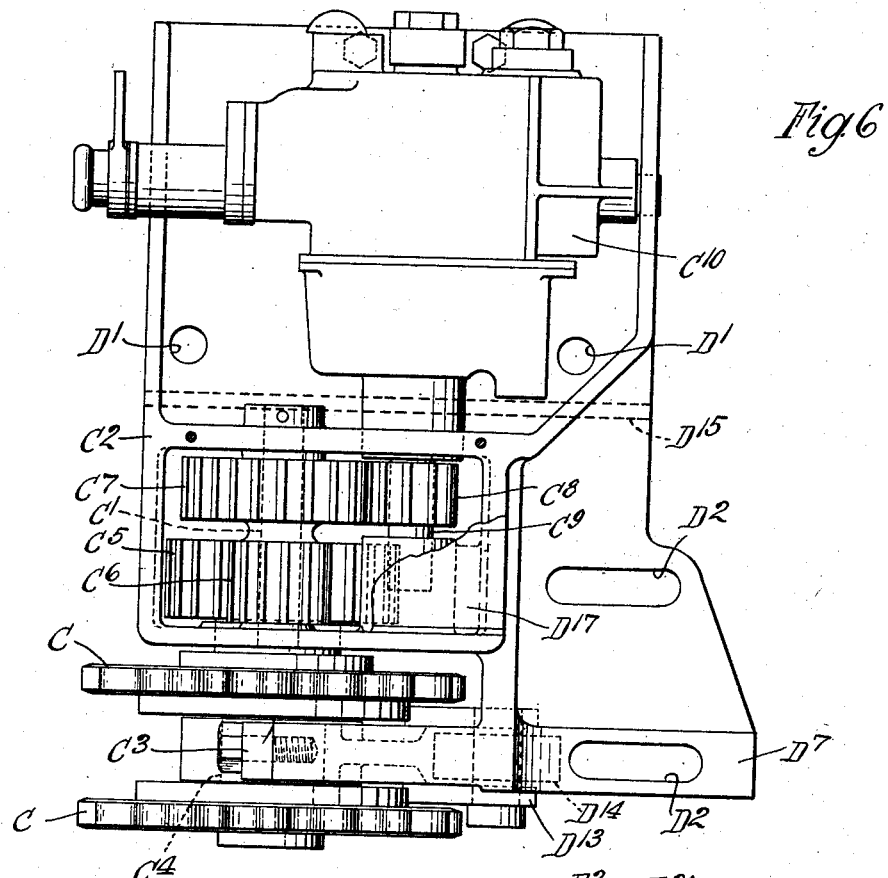
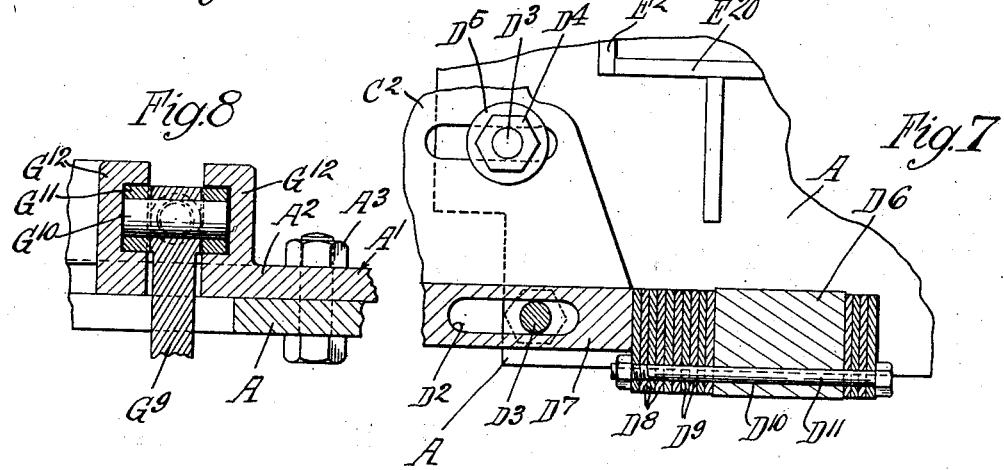
Inventor
Henry H. Talboys
by Parker & Carter
Attorneys Patented Aug. 30, 1932

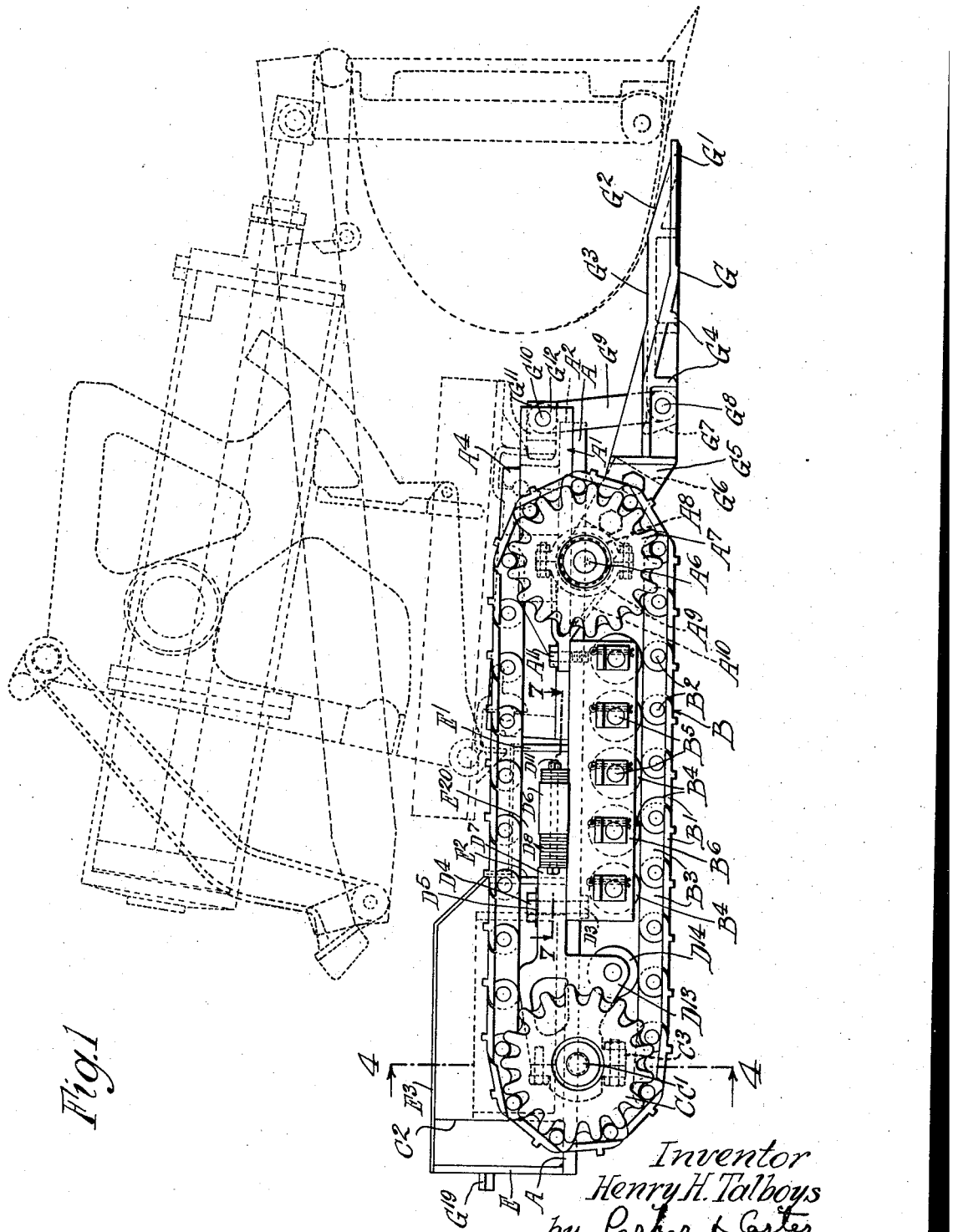

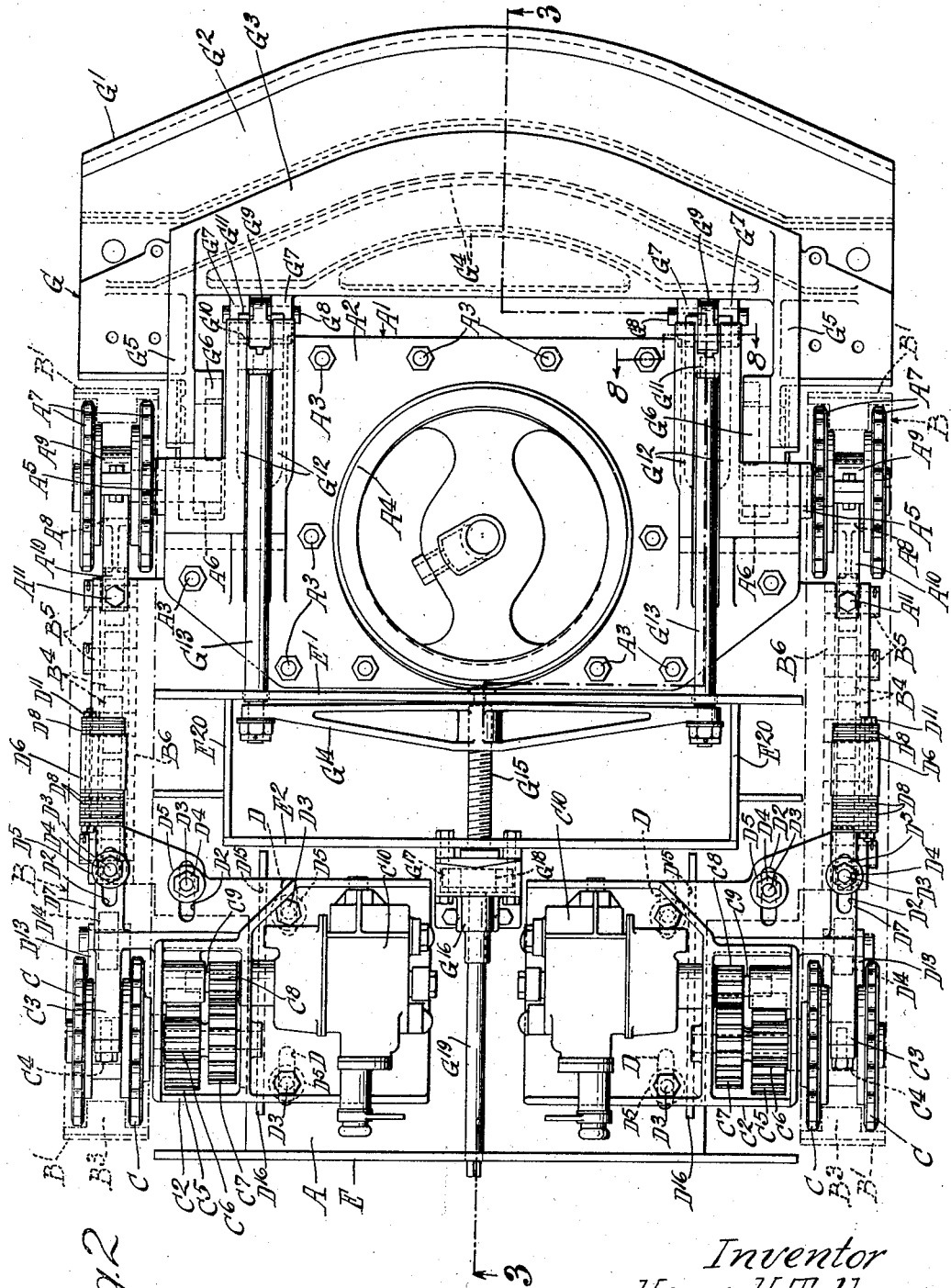

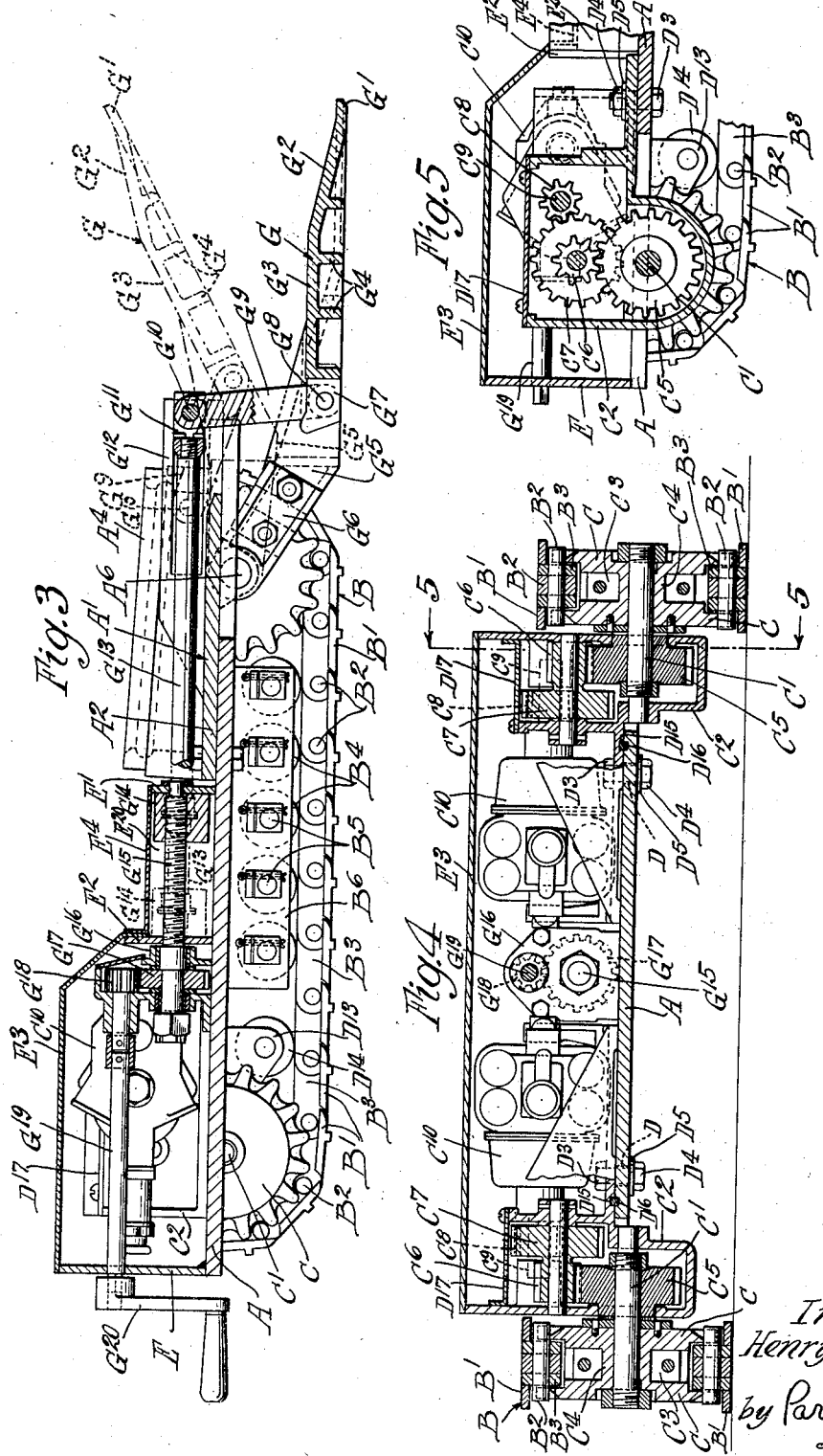

1,874,831

UNITED STATES PATENT OFFICE

HENRY H. TALBOYS, OF MILWAUKEE, WISCONSIN, ASSIGNOR TO NORDBERG MANUFACTURING COMPANY, OF MILWAUKEE, WISCONSIN, A CORPORATION OF WISCONSIN

EXCAVATING MACHINE

Application filed February 12, 1930. Serial No. 427,736.

My invention relates to supporting and conveying means for excavating or lifting machinery and has for one object the provision of supporting means for a shovel. One object is the provision of a ground engaging abutment adapted to be associated with a track laying tractor and to project forwardly thereof, to give additional support for machinery mounted upon said tractor. I have illustrated my invention as applied to such a tractor in association with an excavating shovel, the excavating member of which projects forwardly of the end of a track laying or crawler tractor, a ground engaging means or abutment being provided to extend adjacent the point of actual excavation of a shovel member. Another object of my invention, is the provision of such an abutment or ground engaging member and means for readily lifting it into inoperative position, to permit ready movement of the tractor. Another object is the provision of adjusting means for the endless track of a track laying tractor. Other objects will appear from time to time in the course of the specification and claims.

I illustrate my invention more or less diagrammatically in the accompanying drawings, wherein—

Figure 1 is a side elevation;

Figure 2 is a top plan view, with cover plates omitted;

Figure 3 is a section along the line 3—3 of Figure 2;

Figure 4 is a section on the line 4—4 of Figure 1;

Figure 5 is a section on the line 5—5 of Figure 4;

Figure 6 is a detail of the power plant and rear sprocket unit;

Figure 7 is a section on the line 7—7 of Figure 1; and

Figure 8 is a section on the line 8—8 of Figure 2.

Like parts are indicated by like symbols throughout the specification and claims.

Referring first to Figure 1, I illustrate a general assembly in which a track laying tractor is associated with an excavating shovel. In the remaining views the shovel structure, which is shown in dotted line in Figure 1 is omitted, it being understood that the details of the shovel itself form no part of the present invention, and that a variety of excavating and lifting mechanisms might be employed upon the supporting structure herein shown.

Referring to the drawings and for example to Figures 1 to 4, A indicates a general base plate structure. Mounted upon the base A is the main turn table casting generally indicated as $A^1$ which includes a base portion $A^2$ which may be bolted as at $A^3$ to the base plate A. Upon this turn table the hoisting or bucket structure shown in dotted line in Figure 1 may be mounted in any suitable manner, the details thereof forming no part of the present invention and being not indicated herein except for the circular flange $A^4$ of the turn table proper. Extending laterally from the base $A^2$ are bearing supports $A^5$ in each of which is mounted a shaft $A^6$. Mounted on each such shaft $A^6$ is a double sprocket including the sprocket portions $A^7$ connected by a hub $A^8$. The hub portion $A^8$ is surrounded by the supporting split collar $A^9$ associated with the bracket $A^{10}$ which is secured as at $A^{11}$ to the base plate A.

Passing about the sprockets $A^7$ is the endless track chain generally indicated as B, which includes a plurality of link elements $B^1$ connected by pins or pivots $B^2$. The pivoted links have a central raised track portion generally indicated as $B^3$. Upon this track are supported a plurality of track engaging rollers $B^4$ having shafts $B^5$ mounted in any suitable bearings $B^6$ associated with or welded to the bottom of the plate A, whereby the plate A and the structure mounted thereupon may be supported upon the endless belt or track.

The end of the track opposite the sprockets $A^7$ passes about similar sprockets C. Each such sprocket C is mounted upon a shaft $C^1$. One end of said shaft extends into and is journalled in the wall of a supplemetnal drive housing generally indicated as $C^2$. The other end is supported by the bracket or split collar $C^3$ which penetrates beneath the individual sprocket members and about their connecting hub $C^4$ and forms a part of the housing unit $C^2$. The details of the housing or drive unit are shown for example in Figures 3, 4, 5 and 6. Within the housing $C^2$ and upon the shaft $C^1$ is the gear $C^5$ in mesh with the pinion $C^6$ associated with a gear $C^7$ which in turn is in mesh with the drive pinion $C^8$ which is mounted on the drive shaft $C^9$ actuated by any suitable power plant generally indicated as $C^{10}$. It will be understood that the power plant may be driven by compressed air but the details of the compressed air drive do not form part of the present invention and are not indicated. Referring for example to Figures 2, 6 and 7, a longitudinal adjustment of the drive housing above described may be effected in relation to the base plate A. For example the base plate A may be slotted as at D, D, in opposition to the holes $D^1$ $D^1$ in the bottom of the member $C^2$. The member $C^2$ in turn may be slotted as at $D^2$ $D^2$. $D^3$ $D^3$ generally indicate bolts passing through these various slots, each such bolt being indicated as shown with a nut $D^4$ and a washer $D^5$, whereby the parts may be locked at any desired adjustment. Referring in detail to Figure 7, $D^6$ indicates a block or projection mounted upon or welded upon the base plate A to serve as an adjusting abutment. Interposed between it and the raised end portion $D^7$ of the housing $C^2$ may be any desired number of shims $D^8$. These shims are apertured as at $D^9$ in line with an aperture $D^{10}$ in a block $D^6$, to receive the positioning bolt $D^{11}$. Depending upon the desired adjustment the shims may be shifted from one side to another of a block $D^6$. It will be understood that by longitudinal adjustment of the drive assembly the stretch of the belt or track may be compensated for with a minimum of disturbance of the driving mechanism since the entire driving unit for each belt is longitudinally adjustable on the base plate A and since each unit is independently adjustable. Thus as the chain or track is replaced, or as new links may be put in it, the independent power plant for the two chains or tracks may be positioned. Note also that the housing assembly $C^2$ also supports, by the projection $D^{13}$, the track engaging roller $D^{14}$ which is in addition to the other rollers or supporting members $B^4$. In order to guide the gear assembly in its longitudinal adjustment I also provide a keyway $D^{15}$ and the key $D^{16}$, whereby lateral displacement of the driving assembly is prevented. Each gear box is provided with a removable cover plate $D^{17}$. I also provide a general enclosure which includes an end plate E welded to the end of the base plate A, and two forward or intermediate plates $E^1$ $E^2$. Mounted upon these plates is the general cover plate $E^3$ and an additional cover plate $E^4$.

G generally indicates a ground engaging plate or adjustment which includes a forward ground engaging portion proper $G^1$ the upper face of which is bevelled as at $G^2$. $G^3$ is an intermediate flat portion and $G^4$ indicate downwardly projecting supporting webs lying in the general plane of the lower surface $G^1$. Rearwardly extending from the plate are extensions $G^5$ which may be bolted to arms $G^6$ which arms are pivoted at their opposite ends for rotation about the shaft $A^6$, whereby the abutment or ground engaging plate is mounted upon and pivoted to the plate $A^2$ which in turn is bolted to the base plate A. The rear edge of the plate G is provided with two pairs of rearwardly extending lugs $G^7$ through which pass the pins $G^8$ to which are pivoted the links $G^9$ the upper ends of which are pivoted as at $G^{10}$ to the cross heads $G^{11}$, which cross heads slide in guides $G^{12}$, as shown in Figure 8. It will be understood that these guides $G^{12}$ are part of the casting $A^1$. Controlling the movement of the cross heads along the guides $G^{12}$ are the longitudinally extending tie rods $G^{13}$ the opposite ends of which are secured to the yoke $G^{14}$. The yoke $G^{14}$, in turn, has longitudinal movement imparted to it, as by rotation of the worm $G^{15}$. This worm is journalled into the plate $E^1$, and, at its opposite end, in the casting $G^{16}$, as shown in Figures 2 and 3. The worm may be rotated, as through the gears $G^{17}$, $G^{18}$, the shaft $G^{19}$, and the manual crank $G^{20}$. A manual crank is indicated but it will be understood that any other suitable driving means may be employed for imparting rotation to the worm $G^{15}$, for example a ratchet might be employed. Note that the yoke is housed beneath the cover plate $E^4$ and between the upstanding plates $E^1$ and $E^2$, the ends of which are connected as at $E^{20}$, to provide a relatively complete housing structure.

It will be realized that whereas I have described and shown a practical and operative device, nevertheless many changes might be made in the size, shape, number and disposition of parts without departing from the spirit of my invention. I therefore wish my description and drawings to be taken as in a broad sense illustrative and diagrammatic rather than as limiting me to my specific showing.

The use and operation of my invention are as follows:

I illustrate my invention as applied to an excavating shovel which is shown as mounted upon a crawler or track laying base. In excavating work in which a shovel is employed, the base must underlie the shovel structure, but it is preferable that the shovel or excavating structure be positioned at one end of the base. In the type of shovel herein shown such position is necessary for the proper operation of the shovel, since otherwise the upwardly extending portion of the base would interfere with the proper functioning of the shovel. On the other hand, such position of the shovel in practice tends to tilt the entire structure forwardly or to tilt the base forwardly and to interfere with the solid support of the shovel. I therefore provide what is in effect a forward extension of the base, which, however, is of such height as not to interfere with the normal operation of the shovel. This ground engaging member or extension shoe or abutment extends forwardly substantially beyond the front axle of the endless track, the center of support of the shovel being over said front axle. Since the shovel is digging down under the ground it is necessary that the ground engaging abutment be flush with the ground, when it is supporting the shovel. In this position it is shown in Figure 1, at the start of the shovel stroke. On the other hand, after the shovel has begun excavating, and it is desired to move the device forward, or to move it to another position, the abutment or extension shoe, if in the full line position of Figures 1 and 3, would prevent or impede forward progression. I therefore provide the means herein described for lifting the shoe into dotted line position, as shown in Figure 3, to permit the forward movement of the excavator. When the device is being forwardly moved, of course the shovel may be positioned at another position than that in which it is shown in Figure 1.

In the use of my device I provide a very simple control means for the extension shoe, namely the yoke $G^{14}$ controlled by the worm $G^{15}$. Assuming that this yoke is in the full line position in which it is shown in Figures 2 and 3, a rotation of the worm $G^{15}$ will move the yoke to the dotted line position of Figure 3. As it moves it draws up on the tension or tie rods $G^{13}$ which, in turn, move the cross heads $G^{11}$ rearwardly along the guides $G^{12}$. As these cross heads move to the rear, they draw up upon the plate G, through the links $G^9$, and the plate or extension shoe takes the dotted line position in which it is shown in Figure 3. A reverse rotation of the worm returns it to ground engaging position. The worm serves to lock the cross heads in forward position, and the vertical or practically vertical position of the links $G^9$ prevents the exertion of any force upon the cross heads which would tend to thrust them rearwardly. It will be seen, as in Figures 1 and 3, that when the bottom of the shoe is flush with the bottom of the crawler, the links are practically vertical, and may be made absolutely vertical if desired. The thrust is therefore upwardly against the upper flange of the guides $G^{12}$ which are formed of sufficient thickness and strength to stand this thrust. As above described a separate housing or assembly is provided for each track of the crawler, each such housing or assembly having its own motor and gear reduction, the whole being slidable as a unit on the frame. While I have not gone into detail with the motors it will be understood that I prefer to provide individual throttle or control means for the individual motors, whereby the operator may move the device forward by unitary operation of both motors, and may turn the device by operating one motor alone or by operating the two motors in opposite direction.

Since the length of the crawler chain may vary, due to wear, and due to repair or replacement of individual links or of the chain as a whole, I make the individual drive and gear reduction assemblies adjustable along the base plate A. In making this adjustment I provide the fixed blocks $D^6$ upon the plate A and interpose any desired number of shims $D^8$ between the blocks $D^6$ and the assembly or housing $C^2$.

I claim:

1. In a movable support for machinery and the like, means for moving said support across a supporting surface, a supporting abutment member movably mounted upon said support and adapted to engage said supporting surface, and means for raising it above said supporting surface, including an element longitudinally movable upon the support, and a link, one end of which is in pivotal relation with said longitudinal element and the other with the abutment member.

2. In a movable support for machinery and the like, a supporting abutment pivoted to one end of said support and means for raising and lowering it, including a cross head mounted for horizontal movement upon the support, means for imparting horizontal movement thereto and a link connection pivotally interposed between said cross head and the supporting abutment member.

3. The structure of claim 2 characterized by the provision of a worm and means for rotating it, a nut thereupon, and a connection between said nut and said cross head adapted, in response to movement of said nut along said worm, to impart movement to said cross head.

4. In a movable support for machinery and the like, means for moving said support across a supporting surface, an endless track, a rotating member about which said track passes, a supporting abutment member pivoted concentrically with said rotatable member, and adapted to engage said supporting surface, and means for raising it above said supporting surface, including a member guided for movement in relation to said support along a path transverse in relation to said axis of rotation and a compression connection between said member and the supporting abutment member.

5. In a movable support for machinery and the like, means for moving said support across a supporting surface, endless tracks positioned along opposite sides of said support, rotary members about which said tracks pass, and a supporting abutment member movably mounted upon said support between said tracks and pivoted concentrically with said pivoted members, and means for raising it above said supporting surface, including a member guided for movement in relation to said support along a path transverse in relation to said axis of rotation and a compression connection between said member and the supporting abutment member.

6. In a movable support for machinery and the like, a frame structure, endless supporting tracks associated with said structure and rotatable members, pivoted to said structure, about which said tracks pass, a supporting abutment member pivoted concentrically with one of said pivoted members and means for moving it into and out of the general effective supporting plane of said tracks, including a member guided for movement in relation to said frame structure transversely in relation to the axis of rotation of the abutment member, and an actuating connection between it and the abutment member.

7. In a movable support for machinery and the like, a frame structure, endless supporting tracks associated with said structure and rotatable members, pivoted to said structure, about which said tracks pass, a supporting abutment member pivoted concentrically with one set of said pivoted members and means for moving it into and out of the general effective supporting plane of said tracks, including a cross-head guided for longitudinal horizontal movement along the frame structure at a level above the axis of rotation of the supporting abutment member, and an actuating connection between the cross-head and the abutment member.

8. In a movable support for machinery and the like, a body, endless conveyor tracks upon said body and means for actuating them, pulleys at each end of said tracks, about which said tracks pass, a supporting abutment member pivoted to one end of said movable support and extending substantially forwardly therefrom, said abutment member being pivoted generally concentrically with the pulleys at one turn of the endless conveyor tracks, said abutment member including a lower ground engaging bearing face aligned, when in supporting position, with the plane of the lower bights of the tracks and connecting means between the supporting abutment member and the body adapted, when the supporting member is in ground engaging position, to hold it against unintended movement in relation to the body, and means for actuating said connecting means whereby to rotate the abutment member about its pivot, said abutment member including a rearward and upward extension from the ground engaging portion to the axis of rotation of the abutment.

9. In a movable support for machinery and the like, a body, endless conveyor tracks upon said body and means for actuating them, pulleys at each end of said tracks, about which said tracks pass, a supporting abutment member pivoted to one end of said movable support and extending substantially forwardly therefrom, said abutment member being pivoted generally concentrically with the pulleys at one turn of the endless conveyor tracks, said abutment member including a lower ground engaging bearing face aligned, when in supporting position, with the plane of the lower bights of the tracks and connecting means between the supporting abutment member and the body adapted, when the supporting member is in ground engaging position, to hold it against unintended movement in relation to the body, and means for actuating said connecting means whereby to rotate the abutment member about its pivot, said abutment member including a rearward and upward extension from the ground engaging portion to the axis of rotation of the abutment, and a support for the machinery to be supported, including a turn-table overlying the axis of rotation of the pulley, and abutment member, and positioned closely adjacent the end of the body to which the abutment member is pivoted.

Signed at Milwaukee county of Milwaukee and State of Wisconsin, this 25th day of January 1930.

HENRY H. TALBOYS.